United States Patent

Collier et al.

[15] 3,676,860

[45] July 11, 1972

[54] INTERACTIVE TIE-BREAKING SYSTEM

[72] Inventors: William W. Collier; Ronald M. Smith, both of Wappingers Falls, N.Y.

[73] Assignee: International Business Machines Corporation, Armonk, N.Y.

[22] Filed: Dec. 28, 1970

[21] Appl. No.: 101,720

[52] U.S. Cl. ..........340/172.5, 444/1
[51] Int. Cl. ..........G06f 9/18, G05b 19/22, G06r 15/16
[58] Field of Search..........340/172.5

[56] References Cited

UNITED STATES PATENTS

| | | | |
|---|---|---|---|
| 3,603,935 | 9/1971 | Moore | 340/172.5 |
| 3,599,162 | 8/1971 | Byrns et al. | 340/172.5 |
| 3,573,856 | 4/1971 | Best et al. | 340/172.5 |
| 3,528,062 | 9/1970 | Lehman et al. | 340/172.5 |
| 3,480,914 | 11/1969 | Schlaeppi | 340/172.5 |
| 3,445,822 | 5/1969 | Driscoll | 340/172.5 |
| 3,469,239 | 9/1969 | Richmond et al. | 340/172.5 |
| 3,445,819 | 6/1969 | Cooper et al. | 340/172.5 |
| 3,333,252 | 7/1967 | Shimabukuro | 340/172.5 |
| 3,303,474 | 2/1967 | Moore et al. | 340/172.5 |
| 3,214,739 | 10/1965 | Gountanis et al. | 340/172.5 |

*Primary Examiner*—Paul J. Henon
*Assistant Examiner*—Jan E. Rhoads
*Attorney*—Hanifin & Jancin and Bernard M. Goldman

[57] ABSTRACT

A multiple processor tie-breaking method separately and asynchronously used by each of any number of plural processors contending for a serially reusable resource (SRR). The contending processors independently and asynchronously interact in their use of the tie-breaking method to choose among themselves which processor will get the SRR.

The method uses a common group of registers (or fields) accessible to all contending processors. The method permits uncoordinated fetching and storing of bits in those registers. Only one bit at a time need be fetched or changed by any processor. In fact, the plural independent processors can concurrently fetch or store the same bit in the common group of registers without affecting the reliability of the method.

The priorities among processors dynamically change with every contention in a manner which gives each processor an equitable and equal chance of getting the SRR.

10 Claims, 11 Drawing Figures

INVENTORS
WILLIAM W. COLLIER
RONALD M. SMITH

BY Bernard M. Goldman

ATTORNEY

INTERACTIVE TIE-BREAKING SYSTEM

This invention relates generally to a selection process for a serially reusable resource (SRR) selectable by any of a plurality of components in a computer system. In particular the invention relates to a selection method in which all requesting components interact in an independent manner to select one among themselves to have access to the resource.

A system having such selectability by multiple components is called herein a multiple processor system. The term "multiple processor" applies to any system having multiple components which can select at least one single serially reusable resource (SRR). The term "multiple processor" includes multi-processors having plural CPU's, and also includes any single CPU computer having plural components, which can select a single SRR. The term "processor" is meant to include any single unit capable of performing a logical process which requir s contention for a SRR. Thus a processor can be a computer subsystem such as, for example, any of plural control units, channels, CPU's, etc.

The invention provides a method concurrently usable by several processors (which normally run asynchronously) to permit only one processor at a time to access a serially reusable resource.

The tie-breaking problem is fundamental to asynchronous multiple processing with serially reusable resources. It uses the following principles:

1. When a single processor requests an available SRR it should be permitted to have it.
2. When multiple processors concurrently request a SRR, the tie must be broken. In this situation, it is desirable to break ties in a manner that gives each processor an equal chance, i.e. in the long run all processors will tend to wait the same average length of time to be serviced.

All known prior attempts to solve the tie-breaking problem, i.e. the problem of allowing only one processor at a time to use a SRR, made use of one or more of the following three techniques:

1. A processor could either fetch or store two or more bits as one indivisible operation,
2. A processor could both fetch a bit and store another bit as part of one indivisible operation,
3. One processor (or circuit) in the system had the responsibility for breaking ties among the other processors.

None of these prior art techniques are used by the subject invention. This invention can operate under worst case conditions by fetching one bit at a time, or storing one bit at a time. The prior art also includes a "referee" processor. It is not an efficient way to solve the tie-breaking problem, since an additional dedicated processor is required to be the referee.

The subject invention requires no dedicated processor. The invention treats all contending processors as if they are identical with respect to functional capability; thus none can supervise the other.

It is therefore an object of this invention to provide a method which is concurrently and asynchronously usable by a plurality of processors to permit them to choose one among themselves which will get to use a serially reusable resource.

It is another object of this invention to provide a method usable by each of a plurality of processors to determine tie-breaking among themselves, even though some or all of the processors can manipulate only one binary bit of information at a time.

It is still another object of this invention to provide a method usable by each of a plurality of processors to determine tie-breaking among themselves, even though they manipulate common communication bits asynchronously with respect to each other.

It is another object of this invention to provide a method usable by each of a plurality of processors to determine priority among the processors for using a serially reusable resource, while dynamically reassigning priorities among them based on use of the resource.

It is still another object of this invention to provide a method usable by each of a plurality of processors to resolve contentions among themselves for an SRR in an equitable manner. Thus no processor is to be favored over any other processor in the long run operation of the invention.

It is a further object of this invention to provide a method usable by each of a plurality of processors to determine tie-breaking among themselves, even though no restrictions are placed on the time at which any processor's operations may be performed. Thus between the time a processor tests a bit and then changes it, other processors may intervene to access the bit to either test or set it. Furthermore two processors may fetch a bit at the same time that a third processor changes the value of that bit, wherein the two processors get different values for that bit. Such apparent inconsistency does not harm the operation of the invention. Still further, the operation of the invention is not harmed even though a processor cannot guarantee to set multiple bits, or test multiple bits, at exactly the same time, i.e., if one processor sets two or more bits and another processor tests (fetches) the bits, it is possible that some of the bits will reflect a changed state while other bits reflect their original state.

The process in this invention has the following characteristics:

1. Each processor's operation must include at least two phases: request and control. Several processors simultaneously may be in the "request phase", but only a single processor can be in the "control phase".
2. Each processor must be able to: (a) set a common indication that it is competing, and (b) test the common indication to determine when it is safe to enter into its "control phase". The competing indication must precede the test, in order to insure that two or more processors do not simultaneously conclude that each is the only contender.

Propagation delay is an important factor involved in contentions among processors using high speed computer circuits. If the propagation delay is zero, it is sufficient to require that the operation specified for a processor be done in sequence, without regard to how brief the time interval is between successive steps of the method. If the propagation delay is non-zero, then it is necessary to require both that the operations occur in sequence, and that a minimum delay between successive steps of the method meets one of the following requirements:

a. A set operation is not considered complete until a period of time has passed sufficient for all other processors to detect any change to common data which the set operation may have caused. A test operation is considered to have completed immediately after its initiation.
b. A set operation is not considered complete until a period of time has passed sufficient for the processor executing the set operation to have set the bit which is the most distant bit from the processor and to have detected any change in this bit. A test operation is considered to have completed immediately after its initiation.
c. A set operation is not considered complete until a period of time has passed sufficient for any change in the common bits effected by the set operation to have been reflected in the value of the bits. A test operation is not considered complete until a period of time has passed before the test operation is performed sufficient for a changed value of the bit to be detected by the processor performing the test operation.

For each of the above requirements the period of time for which a given processor must delay is a constant which depends on the time required for the given processor to effect a change in each bit of common data, and for a change in a bit of common data to be detected at each of the processors in the system. Since the value of such a constant at any particular processor is independent of the functions being performed at other processors, it is possible, once the value of this constant is chosen, for the processor to operate completely asynchronously with respect to the other processors.

3. A tie-breaking priority register is used to resolve the situation where two or more processors concurrently request the same SRR. A processor cannot enter into the "control phase" unless:
   a. No higher priority processor has made a request.
   b. All lower priority processors which have made a request have indicated that they have recognized that the higher priority processor is requesting.
4. When a lower priority processor indicates that it has recognized a higher priority request, it does so without losing its place in line. Therefore the processor must have indications for "requesting and active", and "requesting and waiting".
5. To provide each processor with an equal chance, the value priority register is modified as each processor gains control. Incorrect interpretation of the value in the priority register while it is being updated does not result in multiple users, but it permits a processor to jump ahead of its proper place in the waiting line. To eliminate this possibility, the processor in the "control phase" indicates that the priority is to be updated, and it then waits for all other requesting processors to respond by indicating that they are requesting and waiting.

From the above characteristics, it is apparent that each processor must indicate at least three distinct states to the other processors, as follows:

a. Not Requesting — Indicates that the processor is not requesting and not waiting for the resource in question.
b. Requesting — Indicates either the processor is requesting, or the processor is in control.
c. Waiting — Indicates that the processor desires control when its turn comes up, that the processor has recognized a higher priority processor is contending, and that the processor will re-examine the priority after the processor in control has finished a priority modification.

To express these three states requires two bits per processor.

The tie-breaker also requires a number of bits to express the value of the priority indicator. This number of bits is equal to the next integer value greater than or equal to the log (base 2) of the number of processors.

When two or more processors request access to a serially reusable resource (SRR) at exactly the same time, an arbitary decision must be made as to which one is to succeed and which other(s) is (are) to fail. The requesting processor identification is represented by the symbol I. If each of the N number of processors has assigned to it one of the numbers between 1 and N then one way to resolve a tie is always to choose the one with the lower value of I. This is a prior art method of resolving ties. However, it is not equitable since processor 1 will always be favored over processor 2 which will always be favored over processor 3, etc. This method is not used by the subject invention.

In order to be more equitable than this prior art method, the invention introduces a register K, whose value is changed in a controlled manner, and whose value is used for resolving ties. The value of K is updated by each processor as it accesses the SRR.

The foregoing and other objects, features and advantages of the invention will be apparent from the following more particular description of the preferred embodiments of the invention illustrated in the accompanying drawings of which:

Figure 3A:
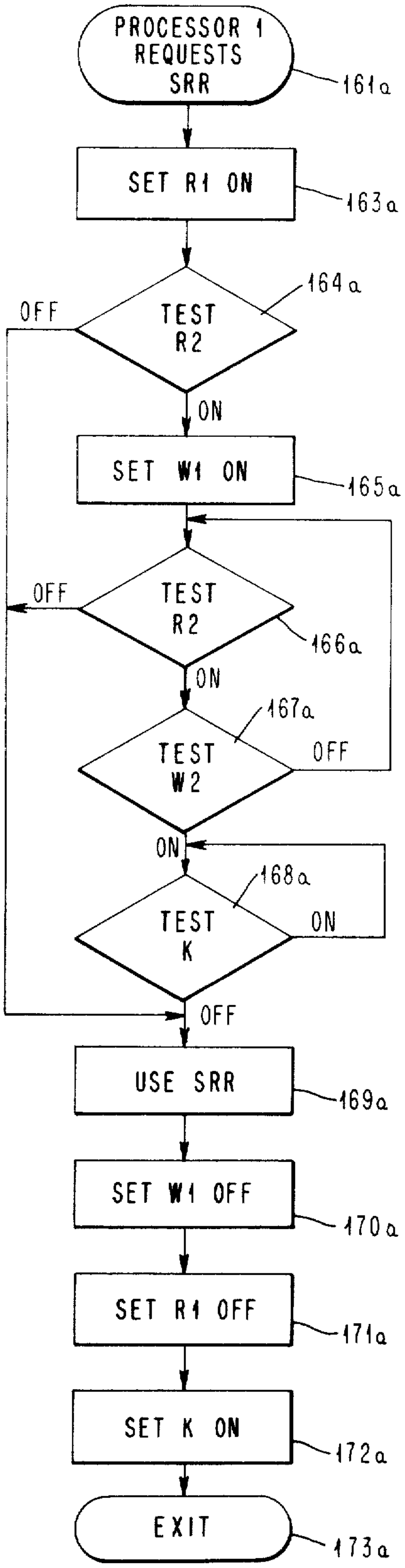
Figure 3B:
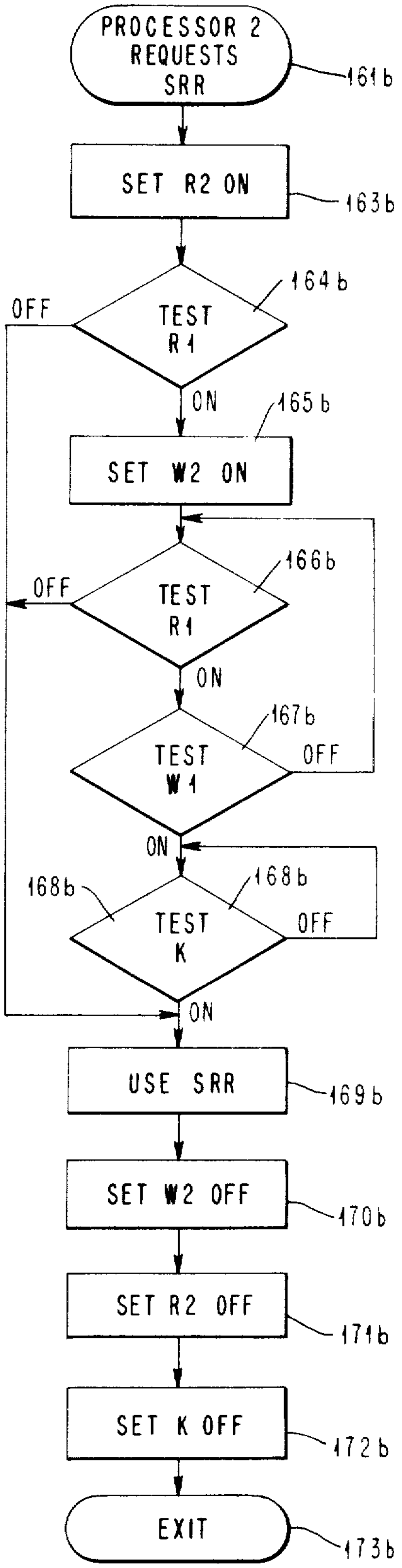

FIGS. 2, 2A, 2B, 2C, and 2D illustrate different flow-diagram embodiments of the invention applicable to any number of processors;

FIGS. 3A and 3B illustrate flow-diagram embodiments for the special case of two processors.

Figure 4:
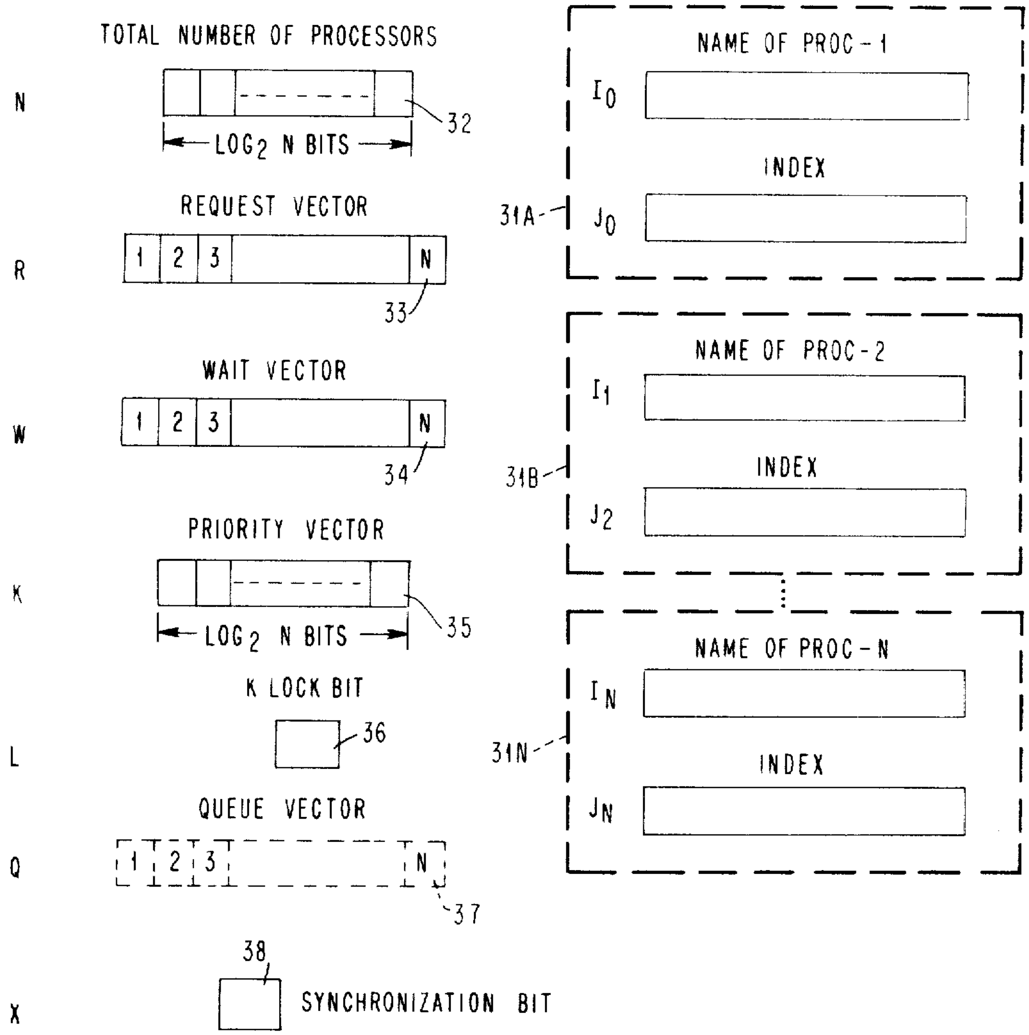
Figure 5:
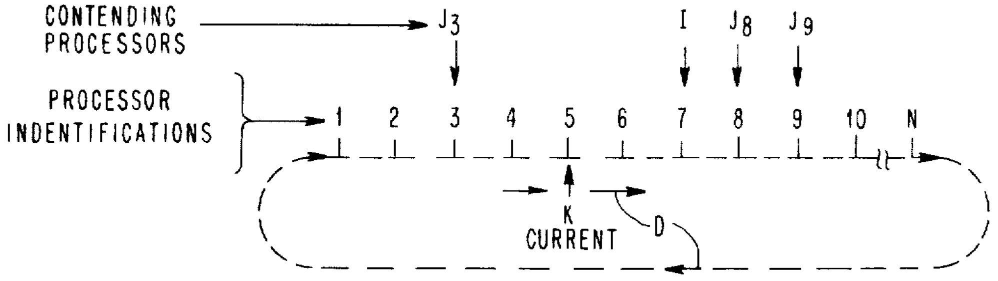

FIG. 4 represents the registers (or memory bit fields) used by flow-diagram embodiments of the invention; and FIG. 5 shows a cyclic scanning of contending processors from a priority indicator K.

Figures 1A, 1B:
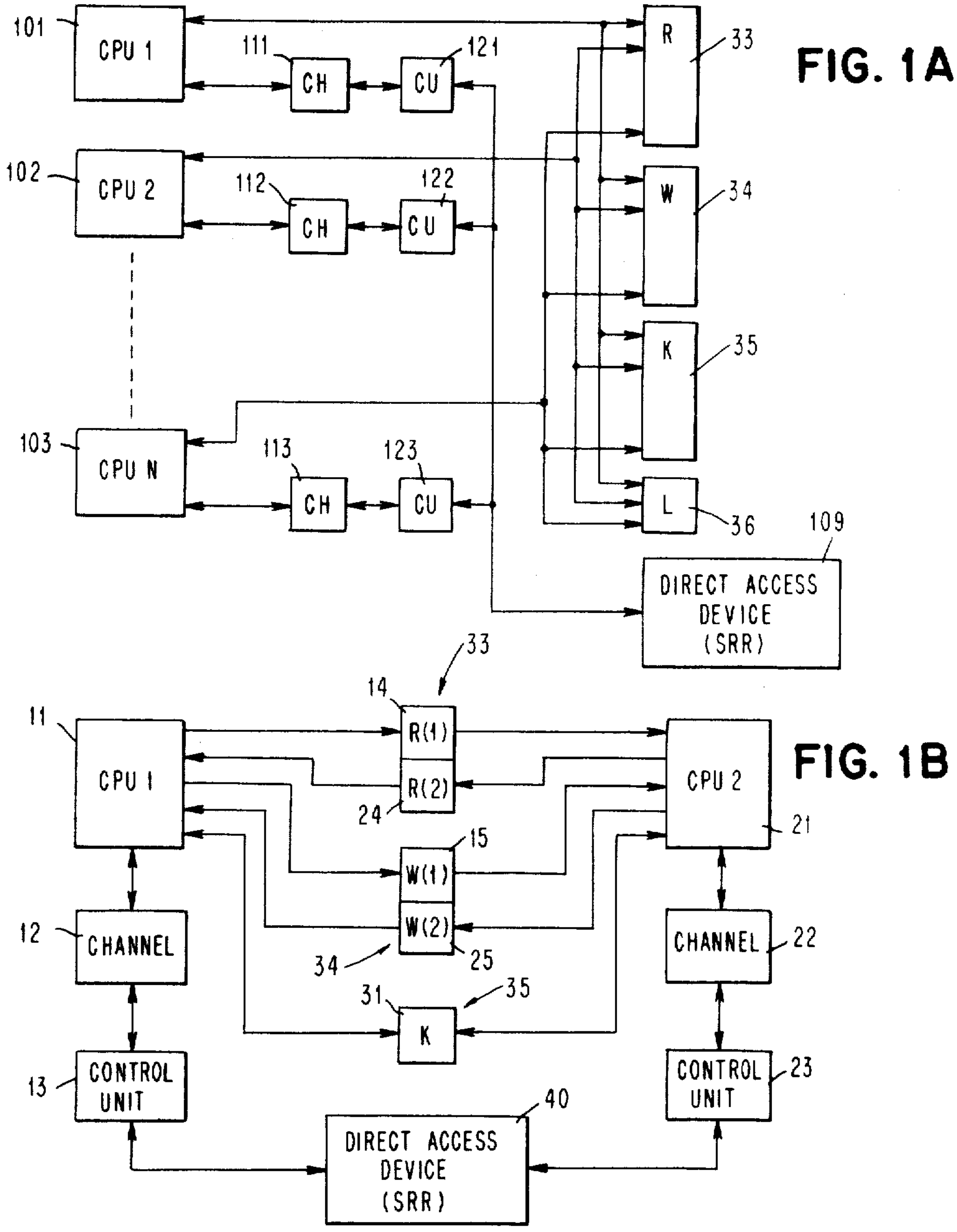
FIG. 1A illustrates a data processing system containing the invention for a multiple number of processors.
FIG. 1B illustrates a data processing system containing the invention for the special case of two processors.

FIG. 1A illustrates a data processing system which has multiple processors shown as plural central processing systems (CPU's) 101, 102 through 103 which may contend for a serially reusable resource (SRR) shown as a direct access device 109 usable by any of the CPU's. Each CPU accesses the SRR via a channel 111, 112, or 113, and a control unit 121, 122 or 123.

Any CPU (or channel) may request the SRR. A commonly accessible set of registers (or fields) 33, 34 35, and 36 are used by each CPU or channel requesting use of the SRR. These registers are also shown in FIG. 4 as vectors R, W, K and L; and their function is explained in detail in regard to FIG. 2. If no other CPU or channel has made a request, the sole requestor gains use of the SRR. However if two or more of the CPU's or channels (while executing different programs) request the SRR while it is available, or sequentially while it is in use, the processors decide among themselves which contender will get the SRR.

Any processor requesting use of the SRR is designated as processor I. To processor I, each other processor is called processor J. Hence every contending processor is designated processor I from its own point of view when using the method of this invention. From the point of view of any processor I, every other processor is therefore designated as a processor J.

Figure 2A:
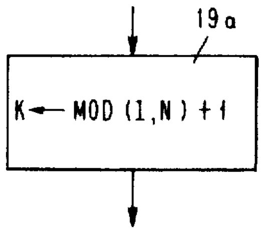
Figure 2B:
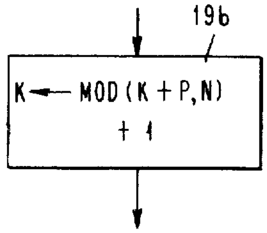
Figure 2:
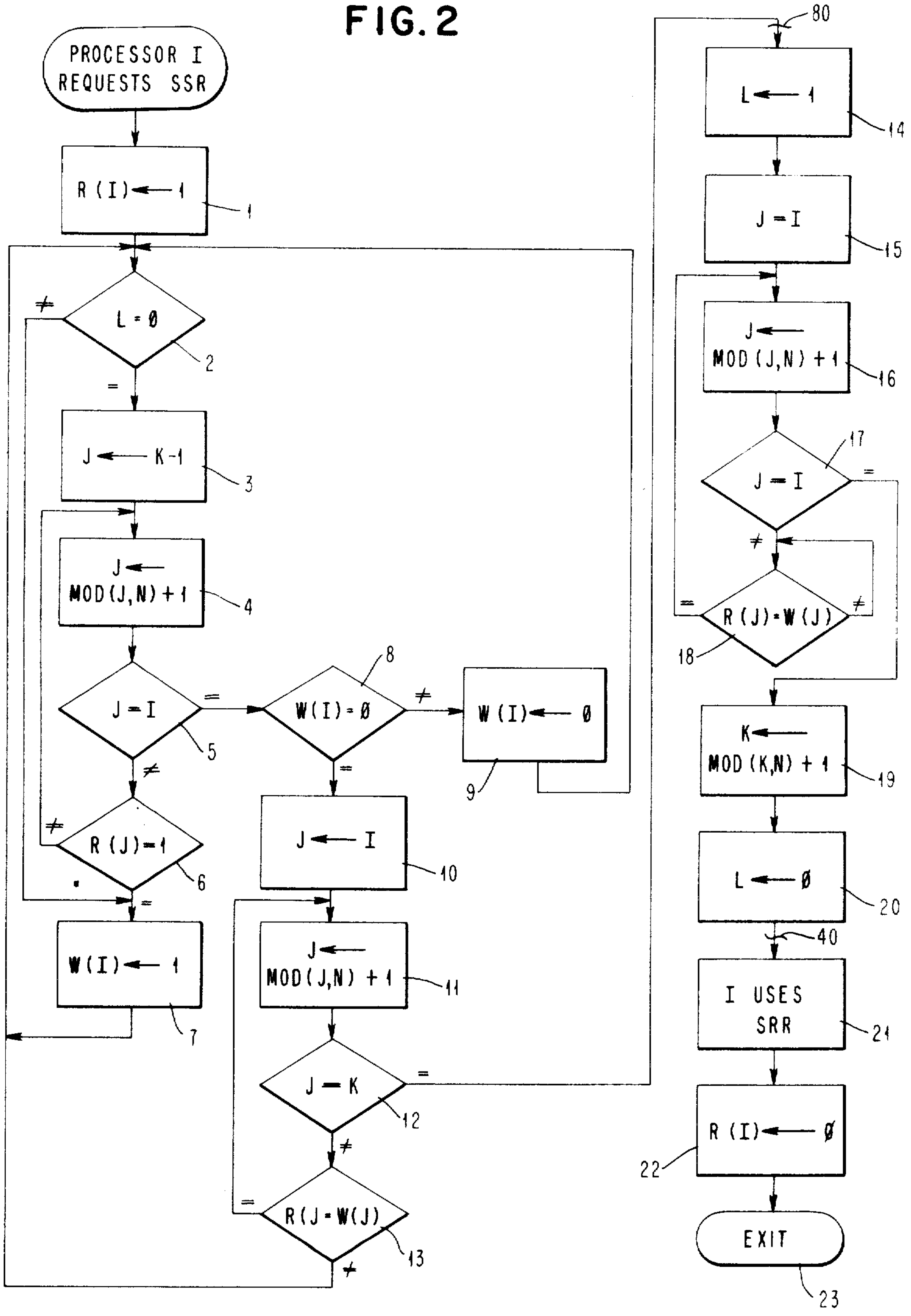
Figures 2C, 2D:
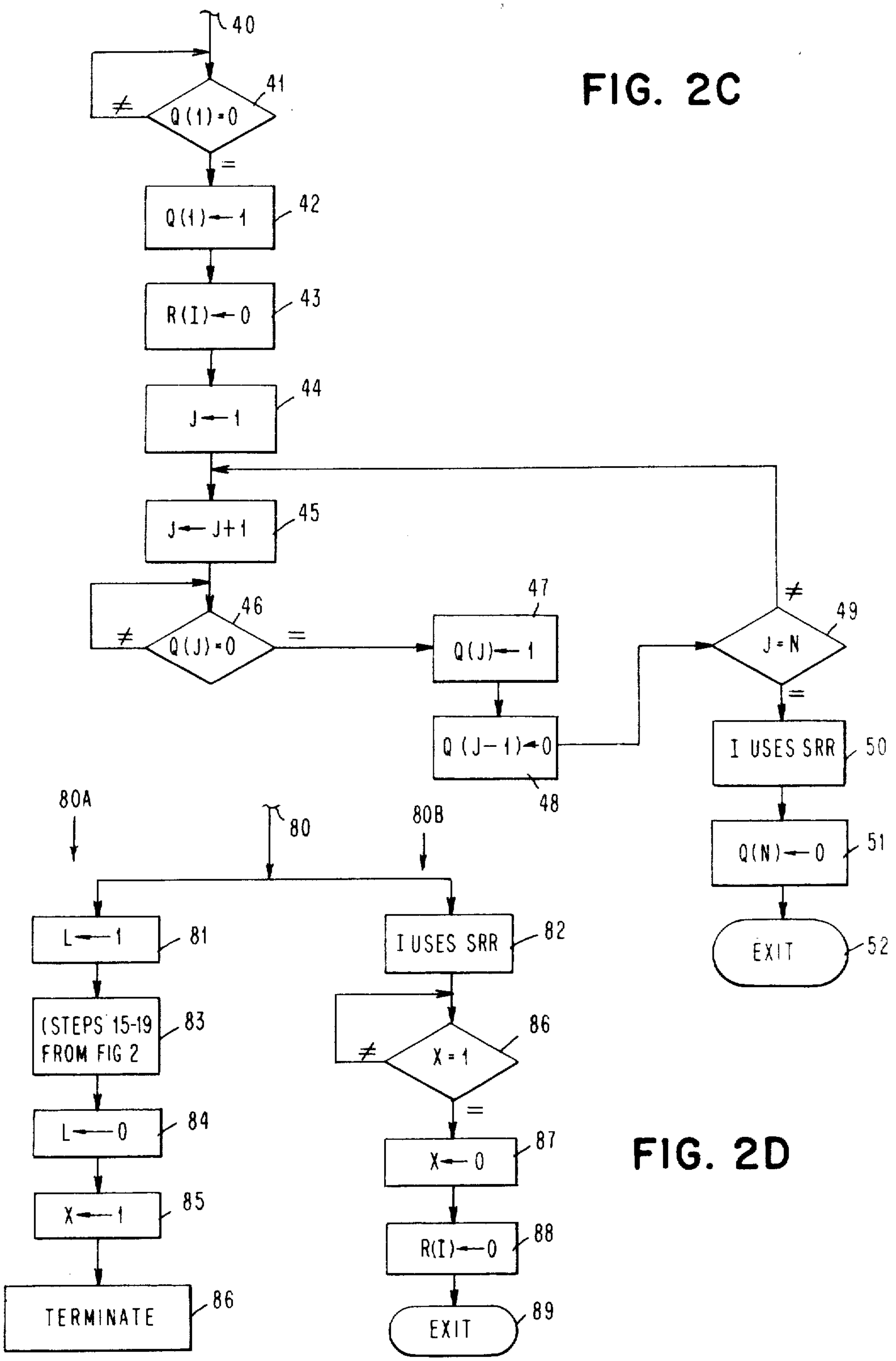

The application of the invention to a system such as shown in FIG. 1A is explained in detail in the discussion of FIGS. 2 through 2D.

FIG. 1B represents an implementation of the invention for the special case of two processors, which are two CPU's 11 and 21 that have access to direct access device (SRR) 40 by means of a channel and control unit 12, 13 or 22, 23. There are five bits (comprising registers 33, 34 and 35) shared between the processors for contending and breaking ties. CPU 1 has request bit 14 and wait bit 15, each of which can be set to zero or one by CPU 1 and can be tested by CPU 2. CPU 2 has request bit 24, and wait bit 25, each of which can be set to zero or one by CPU 2 and tested by CPU 1. Priority bit 31 can be set and tested by both CPU's.

The application of the invention to a two processor system, such as shown in FIG. 1B is explained in detail in the discussion of FIG. 3.

Tie-breaking in FIGS. 2, 2A, 2B, 2C and 3 uses a sequenced ordering of the contending processors beginning from a current value of a priority indicator K. This is clarified with the use of FIG. 5, which shows a single direction D of cycling among the processor identifications 1–N. The cycling direction D moves from N back to 1 to repeat the scan from 1 through N. A tie is broken by selecting the first contending processor encountered after the current value of K in the single cyclic direction. That is, in FIG. 5, processor 7 (processor I) is selected among contending processors 3, 7, 8 and 10 (which are contending processors $J_3$, I, $J_8$ and $J_{10}$, respectively) because processor 7 is closest to the current K in the cycling direction D. This cycling process is implemented within FIG. 2 by steps 4 and 11 each using a modulo function to cyclically increment the value of J.

Any tie occurring during any next period of contention for the SRR is resolved by assigning the SRR to the processor whose identification occurs first in the cyclic sequence $K+1, K+2, \ldots, N-1, N, 1, 2, \ldots, K-1, K$.

There are any number of sub-methods for updating K. Two sub-methods are shown for the overall method of FIG. 2. The simplest sub-method (used by Step 19*a* in FIG. 2A) is to have each processor set K equal to the processor's identification, i.e., $K=I$. Since the value of K is not static, no single processor will be consistently favored over all others. This rule can, however, fail to resolve ties equitably in some circumstances. As an example, consider a situation in which processor 2 makes extremely frequent accesses to the SRR. Then K will have a value of 2 most of the time; if processors 5 and 13 happen to contend, processor 5 is greatly favored over processor 13. Thus, under the sub-method $K = I$, a high frequency user, J, may distort the value of K so that processor J + 1 is favored in the cyclic sequence over processor J + 2, and processor J + 2 is favored over processor J + 3, etc.

The sub-method used by Step 19 in FIG. 2 avoids this problem. If K is assigned the value which follows its current value in the cyclic sequence represented in FIG. 5, the values assumed by K are uniformly distributed over the integers 1 through N; and so frequent usage by one process will not bias the value of K to favor some processors over others. A variation of this sub-method is shown in FIG. 2B: it adds a number P to K each time the SRR is accessed by a processor where P and K have no divisor other than 1 in common i.e., P and K are mutually prime numbers.

The sub-methods used in Steps 19 and 19b allow a very speedy processor to access the SRR several times in succession while a slow processor contends ineffectually and therefore may wait for an extended period of time. Rather than resulting from either an inherent or induced bias in the method, this situation only expresses the fact that the speedier processor contended more effectively. The potential severity of the situation is bounded; no processor will have to wait for more than N other accesses to the SRR. The tie-breaking sub-methods in FIGS. 2, 2A and 2B are used when requests are either truly or apparently simultaneous, or are sequential requests for SRR while it is in use. Tie-breaking may distort the initial sequential temporal ordering of the requests.

The method shown in FIG. 2 may be used concurrently by any number (N) of processors in a system which may compete for a serially reusable resource (SRR). The processor may be, for example, a program, microprogram, or hardware device or entity. The method in FIG. 2 insures that one and only one processor can obtain control over the SRR at one time.

The procedure in FIG. 2 is identical for each processor which can contend for a SRR FIG. 4 shows register (or bit fields) used in the operation of the method in FIG. 2. In FIG. 4, every processor is assigned its own pair of registers (or fields) 31A through 31N, each having registers (or fields) I and J. Thus, field 31A is assigned to the first processor, field 31B is assigned to the second processor, etc., until field 31N is assigned to the last processor (N). Field I contains the identification (an integer in the range 1–N) of the processor owning the respective pair of registers. Field J is used for performing various indexing operations required by that processor when executing the method of FIG. 2.

FIG. 4 also shows other registers (or fields) which contain values used in common by all processors which may request the SRR. They are the common fields N, R, W, K, L, Q and X, which are accessible to all processors. They have respective reference numbers 32 – 38. Each of the common fields contains a sequence of bit values called a vector.

Vector 32 contains the total number, N, of processors which can use the SRR. Fields 33 and 34 contain vectors R and W, each of which have N bits in order to communicate the request state R and the wait state W of each processor to the others. The Jth bit in each of vectors R and W is represented as R(J) and W(J), respectively; and they are the request bit and wait bit, respectively, for processor J.

A priority vector field 35 contains the value K. The priority vector K can have any initial value. The current priority for processor I is (I–K) modulo N, and for any other processor J is (J–K) modulo N, where I and J are the respective processor numbers in the range 1– N.

A lock bit field 36 contains the value L to indicate that the value K is about to be updated. Bit L is initialized to zero before contention can begin for the SRR; this may be done at start-up time for a computer system using the invention.

The method embodiment shown in FIG. 2 comprises the following steps which act as follows:

Step 1: R(I) ← 1 On entering the method, processor I sets its own request bit R(I) to one. This bit remains on until processor I has completed its use of the requested SRR.

Step 2: TEST L = 0 Processor I tests the setting of bit L. When this bit is one, it indicates that some other processor J is in the control phase and is either updating, or waiting to update, the priority indicator K. If the bit L is one, processor I goes to Step 7 to turn on its own wait indicator bit W(I). Then Step 7 loops back to Step 2 to continue to test L until a processor J, which is in the control phase, signals by setting L to zero to indicate that the SRR is available for use. If and when L becomes zero, processor I takes the equal exit to Step 3.

Steps 3, 4, 5 and 6: These steps perform the high priority part of a scan cycle. After Step 2 determines that the SRR is usable, processor I begins a partial scan of contending processors by only looking for higher priority processors. This is done by Steps 3 - 6 testing the request bits R for all higher priority processors from K to (but not including) I. If any request bit R(J) is on, processor I signals that it recognizes the higher priority processor J by turning on its wait indicator W(I) at step 7. Processor I loops through steps 2 – 7 until it sees that all higher priority processors J have completed their use of the SRR and have reached exit Step 23 in FIGS. 2. The following explains each Step 3 – 6 in detail.

Step 3: J ← K–1 Step 3 initializes the value of J to K–1 in preparation for a scan of all higher priority processors J.

Step 4: J ← MOD(J,N)+1 Step 4 increments the value of J modulo N. Thus Step 4 divides the previous value of J by N and adds 1 to the integral remainder to obtain the next value for J.

Step 5: TEST J=I Step 5 indicates when the high priority scan portion is completed by testing if the computed value of J in Step 4 is equal to I for the requesting processor I. If J is not equal to I, the high priority scan is not completed, and Step 6 is entered to continue the scan with the scan cycle. Whenever Step 5 finds J=I, the end is indicated for the high-priority part of the scan, and Step 8 is entered.

Step 6: TEST R(J) =1 Step 6 tests if the current Jth bit position during the scan of register R is set to 1, which would indicate that another higher-priority processor J had made a request for the SRR. Bit R(J) may be either a zero or a one. If it is a zero, there is no request for the SRR by that processor J, and Step 4 is re-entered to obtain the next value of J, so that the next R(J) can be tested for the next processor J within the scan.

Step 7: W(I) ← 1 Processor I turns on its own wait bit W(I) if Step 6 found that a request had been made by a higher priority processor, or if Step 2 found the SRR in use, i.e. lock bit L is set. When W(I) is set to one, this signals that processor I will wait for other processors to occupy and depart from the SRR.

Step 8: TEST W(I) = 0 Upon completion of the high priority scan portion which does not find any contending higher priority processor, processor I tests its own wait bit W(I) to see if it is waiting. If processor I is waiting i.e. W(I) = 1, it must turn off its wait indicator by going to Step 9, and then re-enter Step 2 to repeat the previously described Steps 2–7 while indicating that it is an active contender, i.e. its request bit R(I) remains set to one and W(I) is set to zero.

Step 9: W(I) ← 0 Processor I turns off its wait bit W(I) by setting it to zero. Processor I is then no longer waiting and makes another attempt to get the SRR by going back to Step 2. Processor I can get to the SRR only if its bit W(I) is zero when Step 8 is entered.

Steps 10, 11, 12 and 13: These steps perform the low priority part of a scan cycle by having processor I now test all lower priority processors from I + 1 through K – 1 to see if they are contending and have failed (for any reason) to have their wait bit W(J) set to one. If no such lower priority processor J is found, processor I goes to the control section of the method. If such lower priority processor is found processor I gives up its priority to that lower priority processor by going back to Step 2.

Step 10: J ← I Step 10 initializes J to the current value of I. This causes the scan to skip processor I. When processor I enters Step 10, it has already determined that no higher priority processor is contending.

Step 11: Compute J Step 11 computes each next value of J within the low-priority scan portion. This is done by dividing J by N and adding one to the remainder.

Step 12: TEST J = K This step determines when the low-priority scan portion is completed by testing when the scan has reached a processor with an identification equal to the current priority indicator value in register K. If these values are found to be equal by Step 12, the scan is completed and control passes to Step 14, which assures processor I of being the next processor to get control of SRR. If Step 12 finds non-equality, Step 13 is entered to continue the low-priority scan.

Step 13: R(J) = W(J) Step 13 determined whether any contending lower priority processor has not recognized that processor I has a higher priority; this condition is indicated by the contending lower-priority processor having its bit W(J) set to zero. Step 13 compared a bit in register R with the corresponding bit in register W for the current processor J. Step 13 exits to Step 2 if R(J) is not equal to W(J), which can occur only if the request bit R(J) is set to one and the W(J) bit is set to zero. On the other hand, if the corresponding R(J) and W(J) bits are equal, i.e. both zero or both one, processor J is either not contending, or is contending and has recognized the higher-priority of processor I; and the method iterates back to Step 11 to test the corresponding bit position in registers R and W for the next value of J. Thus if R(J) = 0, then necessarily W(J) = 0 since processor J is not requesting. If R(J) = W(J) = 1, processor J is requesting but waiting, and hence is not actively contending. If R(J) = 1 and W(J) = 0, processor J is actively contending and may not have recognized any higher priority, and may have entered the control phase, i.e. the last phase of the method beginning at Step 14. For example, a lower priority processor J may have already tested this processor's request bit R(I) before it was set to one and may have come to the conclusion that it may enter the control phase. If the unequal exit from Step 13 is taken because another processor J is actively contending, processor I must loop back to Step 2 and perform all the tests over again. If no lower priority processor J is actively contending, the equal exit is taken from Step 13 back to Step 11 to continue the low priority scan portion.

Step 14: L ← 1 This step is the first step in the control phase. The priority indicator lock bit L is set to one to indicate to the other processors J that the SRR is not currently available to them. When Step 14 sets the L bit to one, it affects the actions of other requesting processors. For example, if any other processor J had entered the method at Step 1 and at Step 2 finds that the L bit is set to one, it will branch to Step 7 and then back to Step 2 in a continuous loop until the L bit is set back to zero at Step 20.

Steps 15 – 18: These steps examine all other processors J to see if any could consider itself as still contending for the control phase. Steps 15–18 cause processor I to wait until all other processors have turned on their W(J) bit to indicate no other processor is actively contending.

Step 15: J ← I Step 15 is entered to initialize the value J to the current value of I to begin the scan of all processors to determine if their wait bit W(J) is off.

Step 16: Compute J step 16 computes each next value of J within the scan cycle. This is done by incrementing the value of J by dividing J by N and setting J equal to the remainder plus one.

Step 17: TEST J = I Step 17 determines when the scan cycle is completed by testing for equality between I and the current value of J. Equality indicates that all bits in registers W and R have been scanned, except the corresponding bits at W(I) and R(I). This means that all the other corresponding bits in R and W are either both zero, or both 1. If both are zero, processor J is not contending; and if both bits are 1, processor J is both waiting and contending.

Step 18: R(J) = W(J) Step 18 is entered if Step 17 determines that the scan is not completed, i.e. I is not equal to the currently tested J. In this case, Step 18 compares the currently indexed Jth bits in R and W. If they are not equal, a wait loop is entered by Step 18 looping back into itself until equality is reached between the bits for that processor J. For example, if another processor J is then requesting at Step 1, it must eventually go through Step 7 which will set its W(I) bit to 1. A processor J is either not requesting or is waiting when the equal exit from step 18 is taken back to step 16 to test the next corresponding bits in registers R and W during the scan. Eventually Step 17 finds the scan is completed, and its equal exit will be taken to Step 19.

Step 19: K ← MOD (K, N) + 1 This step changes the setting in the priority indicator K to indicate that processor K−1 now has the lowest priority and that processor K has highest priority.

Step 20: L ← 0 The priority indicator lock bit L is set to zero to indicate that the priority indicator K may now be used by the other processors J.

Step 21: I Uses SRR Processor I now uses the SRR which it has successfully contended for.

Step 22: R(I) ← 0 Processor I resets its own request bit R(I) to zero to indicate that it is no longer in the control phase, and that it no longer is a contender. Other requesting processors are now free to "fight it out".

The method described for FIG. 2 is therefore directly applicable to the system in FIG. 1A in which the CPU identification numbers 1 – N are the processor identification numbers used in FIG. 2, and registers R, W, K and L in FIG. 1A respectively contain the vector R, W, K and L shown in FIG. 4 and used in FIG. 2.

The longer a given processor takes in accessing the SRR, the more likely it is that two or more other processors will be waiting when the given processor completes its access. Thus, the longer each processor takes in accessing the SRR, the less likely it is that other processors' attempts to access the SRR will be handled in first-in, first-out order. The time spent competing for the SRR can be reduced to a minimum by replacing the contention for the SRR with contention for a place in a queue. The processor's position in the queue determines the sequence among contenders for access to the SRR.

FIG. 2C shows a queuing method for determining the sequence among processors contending for an SRR, and its uses, a Queue Vector 37 shown in FIG. 4 as queue field Q. The method in FIG. 2C is entered when the method in FIG. 2 completes Step 20 after bit L is set to zero. This is shown in FIG. 2 at break-line 40, at which the steps in FIG. 2C begin, as follows:

Step 41: TEST Q(1) = 0 Step 41 tests the first bit Q(1) in register Q. If Q(1) is one, Step 41 loops into itself to wait for bit Q(1) to be set to zero by a processor previously using Q(1).

Step 42: Q(I) ← 1 When Step 41 finds Q(1) set to zero, Step 42 is entered to set Q(1) to one. Then processor I has entered the queue of successful contenders which will get the SRR in the order in which they entered the queue vector Q.

Step 43: R(I) ← 0 Step 43 sets R(I) to zero to signify that processor I is no longer contending to get in the queue.

Step 44: J ← 1 Step 44 initializes an index field in register J in the area 31 assigned to this processor I by setting it to one.

Step 45: J ← J + 1 Step 45 determines the address for the next bit in register Q. Step 45 adds one to an index value in the register J with field 31 for processor I. This value J is the index of the next bit in register Q.

Step 46: TEST Q(J) Step 46 determines if the bit Q(J) for processor I can be moved to a higher position in the queue. The move can be made if Q(J) is zero. If Q(J) is one, the next higher position Q(J) in register Q is already occupied, and Step 46 loops into itself to wait for Q(J) to be set to zero by the other processor then in control of it.

Step 47: Q(J) ← 1 When Step 46 finds the next position Q(J) is set to zero, it moves the queue bit for processor I into Q(J). The move is done when Step 47 sets it to one.

Step 48: Q(J-1) ← 0 Step 48 sets the preceding bit Q(J-1) to zero to complete the move. The preceding bit is now available to the next lower priority contender.

Step 49: TEST J = N This step determines if the bit for processor I has reached the end of the queue by occupying the last bit position N. If J is less than N, go to Step 45 to increment the value of J to attempt to move to the next higher position. The effect of Steps 45 – 49 is to move the bit in the vector Q for processor I by one position. Step 45 increments J for addressing the next position in the queue. Once processor I has set A(N) as a result of N−1 iterations through Steps 45–49, Step 50 is entered.

Step 50: I uses SRR When Step 49 senses that the queue bit for processor I has reached the end of vector Q, processor I gets the SRR by entering Step 50.

Step 51: Q(N) ← 0 After processor I completes its use of the SRR, it sets Q(N) to zero to allow the next lower priority processor (if any) to advance in the queue to the last position.

FIG. 2D illustrates an embodiment of the invention in which the successful contender may execute certain steps in the method in parallel with its use of the SRR. The method in FIG. 2D is identical to the method in FIG. 2 up to break-mark 80. After that point in the control sequence, FIG. 2D provides parallelism for some of the functions performed by processor I, wherein the method splits into two paths 80A and 80B. Thus Steps 81 and 82 may be entered simultaneously by processor I wherein lockout bit L is set to one, and processor I begins use of SRR. The amount of time that processor I uses the SRR is a function of the type of resource being used, the speed of the processor, and many other variables which may enter the situation in regard to the use of SRR. Accordingly the amount of time for using the SRR may vary from a very short period to a long period. It is possible that all the steps in path 80A from step 81 to Step 86 might be executed while Step 82 is in execution. Therefore synchronizing steps using a synchronizing bit X are provided near the ends of the two parallel paths.

Thus in the path 80A after Step 81 is completed, Step 83 is entered to execute Steps 15–19 found in FIG. 2 in the manner explained in connection with FIG. 2. Upon the execution of that last Step 19, Step 84 is entered which sets the lock bit L to zero. Synchronization bit X is set to one by Step 85 to aid in the synchronization of the two paths. Then Step 86 is entered to terminate path 80A.

In path 80B, Step 86 is a synchronization step which is entered when Step 82 is completed. Step 86 tests whether bit X has been set to one by Step 85 in path 80A. As a result, path 80B is held up at Step 86 until bit X has been set to 1 by Step 85. When path 80B finds that path 80A has set bit X to zero, path 80B can continue from Step 86 to Step 87.

Thus path 80B can not go beyond Step 86 until bit X has been set to one by path 80A.

Then Step 87 in path 80B, sets bit X to zero, and Step 88 sets bit R(I) to zero. Then path 80B exits, wherein the contention method has been completed for processor I with respect to its current use of the SRR, until processor I makes its next request for SRR.

FIGS. 3A and 3B illustrate flow-diagram embodiments in which only two processors contend for a SRR. The two processor special case permits substantial simplication over the general case in FIG. 4 which permits any number of processors to be contending for an SRR.

In the two processor case, bit L is not needed. The method in FIGS. 3A and 3B, like the methods in FIGS. 2, 2A, 2B and 2C, may be used in any system where access to the common bits in registers R, W, K and L is truly asynchronous.

The methods in FIGS. 3A and B are essentially the same except for a different suffix a or b to identify their respective FIG. 3. Processor 1 executes all Steps 161*a* – 173*a* of the method in FIG. 3A. In FIG. 3B, processor 2 executes Steps 161*b* – 173*b* and may execute the method separately or concurrently with processor 1. The method in either FIG. 3A or 3B comprises the following steps to resolve contentions between two processors 1 and 2, which is described for processor 1 in FIG. 3A, but is applicable to FIG. 3B by interchanging 1 and 2.

Step 161: Processor 1 requests the SRR.

Step 163: Set R1 on The request bit for processor 1, which is R1, is set to one. This signals that processor 1 intends to use SRR if, and when, possible.

Step 164: TEST R2 Processor 1 tests to see whether or not processor 2 had also declared its intention to use SRR. If not, processor 1 gets the SRR by taking the off exit from Step 164 to enter Step 169. Otherwise, processor 1 continues to the next Step 165.

Step 165: Set W1 on If contention exists, Step 165 is entered. Processor 1 sets its wait bit W1 to one to signal to processor 2 that processor 1 has now advanced as far as step 165.

Step 166 Test R2 Processor 1 tests the processor 2 request bit R2. If it is off, the method goes to Step 169. If R2 is on, contention with processor 2 still exists, and Step 167 is entered.

Step 167 TEST W2 Processor 1 tests the processor 2 wait bit W2. If off, processor 2 may be using the SRR and processor 1 returns to Step 166. If bit W2 is on, processor 1 proceeds to Step 167.

The effect of Steps 165*a*, 166*a* and 167*a* is to handle the case when processor 2 has entered Steps 163*b* and 164*b* at approximately the same time that processor 1 entered Step 163*a* and 164*a*. In one case, processor 2 has preceded processor 1 to the SRR, and in this case processor 1 must wait. In the other case, processor 2 has detected that processor 1 has requested. In this case both processors must wait in Steps 166 and 167 to ensure that the other has gotten as far as Step 165*a* or 165*b*.

Step 168: TEST K Step 168 determines which processor, 1 or 2, is allowed to have the SRR. K is a bit with a value of either zero or one. If K is off, than processor 1 is allowed to proceed and processor 2 waits. If K is on, then processor 2 is allowed to proceed and processor 1 waits.

Step 169: USE SRR During this step, the SRR is being used by processor 1.

Step 170: SET W1 OFF Upon completion of use of SRR, processor 1 sets its request bit W1 to zero.

Step 171: Set R1 OFF Upon completion of use of SRR, processor 1 sets its request bit R1 to zero.

Step 172: SET K ON Processor 1 sets the priority indicator to its opposite state to update it for the next tie-breaking contest, so that processor 2 will next have higher priority. If processor 2 is waiting at Step 167*b*, it can now proceed to obtain the SRR.

Step 173: Processor 1 exits from the contention method and does not use it until it makes its next request, whereupon processor 1 will again enter the method at Step 161a.

To assist the reader's understanding of the term "serially reusable resource (SRR)", the following definitions and examples are provided:

A "resource" is any identifable element, or subelement, of a data processing system, such as a program, data element, data set, register bus, hardware elements or units, etc.

A "serially reusable resource (SRR)" is any resource for which it is physically or logically required for which it is physically or logically required to restrict usage to a single user for some period of time.

Examples of "serially reusable resources (SRR)" are:

1. Data or information which can be updated,
2. Programs which can be logically executed by only one user at a time.

3. I/O devices, other hardware objects, or portions of a hardware device such as a track, or record, for which it is logically valid for only one user to be using it at a time.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method individually and asynchronously used by each of multiple processors for resolving contentions among them for a serially reusable resource, comprising the steps of
  setting a request bit for each processor contending for said resource, each request bit being assigned to a different processor,
  setting a wait bit for each contending processor which finds the resource not currently available, each wait bit being assigned to a different processor,
  reading a priority indicator to identify a specified request bit and a specified wait bit for a specified processor,
  sensing the set or unset state of the request bits and wait bits in a predetermined order to determine whether other processors are contending, another processor being contending if its request bit is set, said sensing step including:
    high-priority sensing whether any request bit is in set state within the range of bits from said specified request bit to a particular request bit assigned to a requesting processor in said predetermined order to determine whether a higher priority processor is requesting said resource,
    low-priority sensing the set state of both the request bit and wait bit for any processor within the range of bits from said particular request bit to said specified request bit in said predetermined order to determine whether any lower priority processor has requested priority but is not waiting,
  transferring control of said resource to a contending processor when its execution of said sensing steps determines it to be a successful contender,
  testing every corresponding request bit and wait bit except for those of the successful contender, and waiting until both bits become set if any other contending processor has its request bit set and its wait bit unset,
  using said resource by said successful contender,
  and releasing said resource by said successful contender when it is completed,
  whereby the other contending processors continue independently to use this method to determine the next successful contender.

2. A method for individually and asynchronously resolving contentions as defined in claim 1 in which a new requesting processor enters the contention, and said new requesting processor performs the steps of
  detecting a lock bit set by the successful contender to indicate that all currently unsuccessful contenders should set their wait bit,
  setting the wait bit of said new requesting processor,
  repeatedly examining the setting of said lock bit until it is detected to have been reset by said successful contender,
  repeating said high-priority sensing step until no other higher-priority contenders are found to exist,
  resetting said wait bit of said new requesting processor, and
  repeating said high-priority sensing step to determine whether any higher-priority contender has its request bit set.

3. A method for individually and asynchronously resolving contentions as defined in claim 1 in which a new requesting processor enters the contention, including the steps of
  setting a lock bit by said successful contender,
  testing the state of said lock bit by said new requesting processor, and
  setting a wait bit for said new requesting processor upon said testing step determining said lock bit is in its set state.

4. A method for individually and asynchronously resolving contentions as defined in claim 1 in which there is another contending processor performing the steps including
  entering said high-priority sensing step to determine whether the request bit is in set state for either the successful contender or a further contending processor,
  said detecting step being entered by said another contending processor, and
  whereby said another contending processor will set its wait bit pending completion of use of said resource by said successful contender.

5. A method for resolving contentions among multiple processors as defined in claim 1 including the steps of
  changing the setting of said priority indicator after said testing step finds the wait bit set for all other contending processors, the indicator having any initial arbitrary integer value in the range from "one" through N, in which N is equal to the number of processors, and stepping the current value of the priority indicator to the next higher integer value, unless the current value is N in which case the current value is replaced with the value of "one".

6. A method for resolving contentions among multiple processors as defined in claim 1 including the steps of
  changing the setting of said priority indicator after said testing step finds the wait bit set for all other contending processors, the indicator having any initial arbitrary integer value in the range from "one" through N, in which N is equal to the number of processors, and modifying the current value of the priority indicator by adding to it a value P, and subtracting N from their sum when the sum is greater than or equal to N, and adding "one" to the result, in which $P+1$ is any integer mutually prime to N.

7. A method individually and asynchronously used by each of two processors for resolving contentions between a given processor and another processor for a serially reusable resource, comprising the steps of
  setting the request bit for the given processor,
  sensing the request bit of the other processor and, upon finding it to be unset, making use of the serially reusable resource,
  sensing the request bit of the other processor, and upon finding it to be set, setting the wait bit for the given processor,
  sensing the request bit of the other processor and, upon finding it to be unset, making use of the serially reusable resource,
  sensing the wait bit of the other processor, and, upon finding it to be unset, repeating the previous step,
  sensing the current value of a tie-breaker bit and continuing to sense the value of the tie-breaker bit for so long as the value of the tie-breaker corresponds to the other processor,
  using the serially reusable resource,
  setting the wait bit for the given processor to the reset state,
  setting the request bit for the given processor to the reset state,
  and setting the value of the tie-breaker to correspond to the other processor.

8. A method as defined in claim 1 permitting the successful contender to perform certain control functions in parallel with usage of the serially reusable resource, comprising the steps of
  setting a lock bit to its set state,
  testing every corresponding request bit and wait bit except for those of the successful contender, and waiting until both bits become set if any other contending processor has its request bit set and its wait bit unset,
  setting the lock bit to the reset state,
  setting a synchronization bit to its set state,
  terminating the independent performance of any further function by a portion of the successful contender which performed the above steps,
  the preceding steps being executed in parallel with the following steps,
  using the serially reusable resource, sensing the state of the synchronization bit, such sensing to continue until the synchronization bit is determined to be set, setting the synchronization bit to its reset state, and setting the request bit for the successful contender to its reset state.

9. A method as defined in claim 1 for fixing the sequence in which subsequent contender processors will use a serially reusable resource while the successful contender is using the serially usable resource, in which a subsequent contender uses the steps of completing execution of said testing step, sensing an initial bit position in a queue field until it becomes reset, setting said initial bit position to its set state to provide an indicator bit that represents said subsequent processor's position in the queue field, setti .g the request bit for said subsequent contender to its reset state to indicate it is no longer waiting to enter the queue field, moving said indicator bit to successively higher bit position in said queue field found not currently used as an indicator for another contender, until said indicator bit is located in the highest bit position in said queue field, using and serially reusable resource by said subsequent contender, and setting said indicator bit to its reset state.

10. A method as defined in claim 9 in which said moving step includes the steps of setting an index to correspond to the first bit position of the queue field, stepping the index to correspond to the next bit position in sequence in the queue field, sensing said next bit position in the queue field until it becomes reset, setting said next bit to its set state to represent said indicator bit, resetting the bit position prior to said indicator bit, detecting the value of the index to determine if it has been stepped to the last bit position in the queue field, and repeating the preceding five steps until said detecting step finds said indicator bit at said last bit position in said queue field.

* * * * *

PO-1050
(5/69)

UNITED STATES PATENT OFFICE
CERTIFICATE OF CORRECTION

Patent No. 3,676,860 Dated July 11, 1972

Inventor(s) William W. Collier, et al

It is certified that error appears in the above-identified patent and that said Letters Patent are hereby corrected as shown below:

Column 9, line 20, the word "A(N)" should read --Q(N)--. Column 10, line 69, delete "for which it is physi-"; line 70, delete "cally or logically required". Column 11, line 47, the word "it" should read --its use--. Column 14, line 3, the word "and" should read --the--.

Signed and sealed this 6th day of February 1973.

(SEAL)
Attest:

EDWARD M.FLETCHER,JR.
Attesting Officer

ROBERT GOTTSCHALK
Commissioner of Patents 623-2721-0